G. F. & M. JEROME.
Mower.
No. 21,607. Patented Sept. 28, 1858.
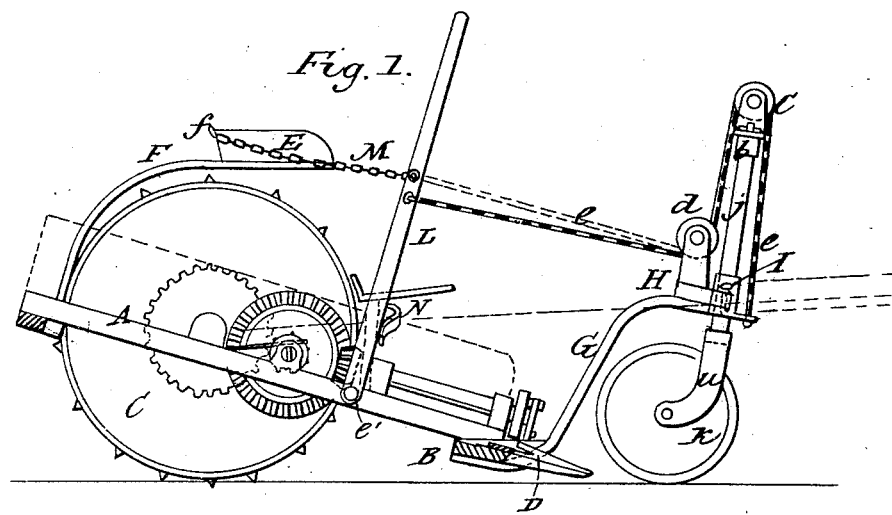
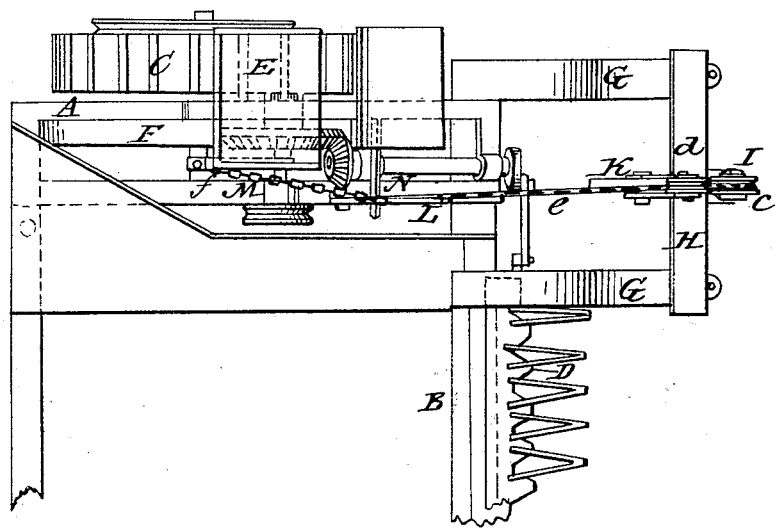

UNITED STATES PATENT OFFICE.

GEO. F. JEROME AND MOSES JEROME, OF MINEOLA, NEW YORK.

IMPROVEMENT IN MOWING-MACHINES.

Specification forming part of Letters Patent No. 21,607, dated September 28, 1858.

*To all whom it may concern:*

Be it known that we, GEORGE F. JEROME and MOSES JEROME, of Mineola, in the county of Queens and State of New York, have invented a new and useful Improvement in Mowing-Machines; and we do hereby declare that the following is a full, clear, and exact description of the same, reference being had to the annexed drawings, making a part of this specification, in which—

Figure 1 is an inner side view of the main frame of a mowing-machine with our improvement applied to it. Fig. 2 is a plan or top view of same.

Similar letters of reference indicate corresponding parts in the two figures.

This invention relates to the employment or use of certain means for elevating and depressing the cutting device or sickle and sustaining the same, the parts being arranged as hereinafter fully shown and described, whereby the sickle, as the machine is drawn along, is allowed to readily conform to the inequalities of the surface of the ground.

To enable those skilled in the art to fully understand and construct our invention, we will proceed to describe it.

A represents the main frame of a mowing-machine, and B is the finger-bar attached to the front part of the main frame.

C is the driving-wheel, from which motion is communicated to the sickle D by any suitable means. The driving-wheel is placed at the outer side of the main frame, as shown in Fig. 2.

E is the driver's seat, which is attached to a wooden spring-bar, F, the lower end of said bar being attached to the back part of the main frame.

To the front end of the main frame A two shoes, G G, are attached. These shoes are of curved form, extending outward from the main frame, then passing upward and again extending outward in S form, as shown clearly in Fig. 1. The upper ends of the shoes G G are connected by a cross-bar, H, to which the draft-pole is attached by a flexible joint. The shoes G G extend upward sufficiently high to nearly intersect the line of draft. (Indicated by the red line in Fig. 1.

To the front edge of the bar H there is attached a socket, I, in which the arbor J of a caster-wheel, K, is fitted and allowed to slide freely. The wheel K is fitted in a fork, $a$, as usual, and on the upper end of the arbor J a swivel, $b$, is placed, said swivel containing a pulley, $c$.

To the bar H a pulley, $d$, is attached, and to the lower end of the socket I there is attached a chain or cord, $e$, which passes over the pulley $c$ and under the pulley $d$, and is attached to a lever, L, which is attached to the main frame A by a fulcrum-pin, $e'$.

To the lever L a chain, M, is attached, and to the seat E there is attached a hook, $f$, on which either of the links of a chain, M, may be placed at certain times to retain the lever L at the desired point.

N is a spring, which is attached to the main frame A, and against which the lower part of the lever L bears.

From the above description it will be seen that the sickle and finger-bar, when raised, are supported by the caster-wheel K, and that when said parts are lowered the spring N serves as a stay to the lever L. The weight of the front part of the main frame, together with the finger-bar and sickle, will of course incline the finger-bar and shoes toward the ground, and the spring N transmits a great portion of the weight to the caster-wheel, so that the finger-bar will be nearly counterpoised, gradually rising and falling to accommodate itself to the inequalities of the ground, thereby decreasing both the direct and side draft. The driver, by drawing back the upper part of lever L, raises the finger-bar, and it may be retained at any desired height by securing it to the seat E by means of the chain M. The sickle, therefore, may be readily raised to pass over any obstructions that may lie in its path, and also retained elevated as the machine is being drawn from place to place. The caster-wheel is allowed to turn readily without affecting the pulley $c$, and the socket I is allowed to rise and fall freely on the arbor J, creating as little friction as possible, and the pull of the cord or chain $e$ directs a downward pressure on the arbor J, or longitudinally with it, so that no friction will be produced by lateral pressure on the arbor. By having the draft-pole attached to the bar H in or nearly in the same plane with the line of draft there will be little or no tendency exerted by the draft to throw the sickle upward, as is the case in those machines where the draft-pole is attached to the main frame considerably below the line of draft. This latter advantage is obtained by the shoes G G, which also permit the use of a good sized caster-wheel, K, and one that may be placed sufficiently far back as to be nearly in line with the sickle D, and thereby insure a more perfect operation as regards the conforming of the sickle to the undulations of the ground.

We are aware that curved shoes have been attached to reapers and mowers and arranged in various ways, and we do not claim broadly, and irrespective of the arrangement herein shown and described, such device. We are also aware that caster-wheels have been used and applied in various ways both to reaping and mowing machines. We therefore disclaim the caster-wheel separately, or in itself considered; but,

Having thus described our invention, what we claim as new, and desire to secure by Letters Patent, is—

1. The caster-wheel K, when attached by the shoes G G, or their equivalents, by having its arbor J pass loosely through a socket, I, attached to the cross-bar H, and having a swivel, b, at the upper end of the arbor, so that by the aid of pulleys c d, or other guides, and a chain or cord, e, the weight of the finger-bar and sickle will be transmitted to the caster-wheel and the finger-bar and cutter raised and lowered, while the caster-wheel is allowed to turn freely in any direction without affecting in any degree its concomitant parts.

2. The lever L and spring N, in combination with the chain or cord e, caster-wheel K, and shoes G G, when the whole are arranged to operate substantially as and for the purpose set forth.

GEORGE F. JEROME.
MOSES JEROME.

Witnesses:
J. W. COOMBS,
M. HUGHES.